United States Patent
Jha et al.

(10) Patent No.: US 9,571,367 B2
(45) Date of Patent: *Feb. 14, 2017

(54) SELECTION OF MESSAGE PASSING COLLECTIVES IN PRESENCE OF SYSTEM NOISE

(71) Applicant: International Business Machines Corporation, Armonk, NY (US)

(72) Inventors: Saurav K. Jha, Madhubani (IN); Nysal Jan K. A., Bangalore (IN); Saumil G. Merchant, Bengaluru (IN); Giridhar M. Prabhakar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/053,254

(22) Filed: Feb. 25, 2016

(65) Prior Publication Data

US 2016/0173348 A1   Jun. 16, 2016

Related U.S. Application Data

(63) Continuation of application No. 14/445,091, filed on Jul. 29, 2014.

(51) Int. Cl.
  *H04L 12/26* (2006.01)
  *G06F 15/173* (2006.01)
  *G06F 9/54* (2006.01)

(52) U.S. Cl.
  CPC ............ *H04L 43/087* (2013.01); *G06F 9/546* (2013.01); *H04L 43/12* (2013.01)

(58) Field of Classification Search
  USPC .................................................. 709/224, 223
  See application file for complete search history.

(56) References Cited

U.S. PATENT DOCUMENTS

| | | | |
|---|---|---|---|
| 6,839,754 B2* | 1/2005 | Nowak | H04L 12/2697 709/224 |
| 7,380,005 B1* | 5/2008 | Li | G06F 9/546 709/226 |
| 7,650,434 B2 | 1/2010 | Blumrich et al. | |

(Continued)

FOREIGN PATENT DOCUMENTS

WO   2013070106 A1   5/2013

OTHER PUBLICATIONS

Beckman et al., "The Influence of Operating Systems on the Performance of Collective Operations at Extreme Scale", 2006 IEEE International Converence on Cluster Computing, pp. 1-12, doi 10.1109/CLUSTR.2006.311846.

(Continued)

*Primary Examiner* — Jude Jean Gilles
(74) *Attorney, Agent, or Firm* — David B. Woycechowsky (57) ABSTRACT

Consideration of system jitter in selecting a "message passing collectives algorithm" used in a message passing interface. A set of multiple message passing collectives algorithms are ranked against each other with at least some consideration of relative jitter-related performance as between the algorithms. The consideration of jitter includes consideration of "system jitter" (OS jitter and/or network jitter). In some embodiments, multiple rankings are performed for different levels of system jitter.

1 Claim, 5 Drawing Sheets

(56) References Cited

U.S. PATENT DOCUMENTS

| | | | |
|---|---|---|---|
| 8,032,397 B2* | 10/2011 | Lawless | G06F 19/3418 705/2 |
| 8,160,845 B2 | 4/2012 | De et al. | |
| 8,219,878 B1 | 7/2012 | Varnica et al. | |
| 8,271,990 B2 | 9/2012 | De et al. | |
| 9,367,301 B1* | 6/2016 | Serrano | G06F 8/67 |
| 2002/0116154 A1* | 8/2002 | Nowak | H04L 12/2697 702/186 |
| 2003/0177154 A1* | 9/2003 | Vrancic | G06F 1/12 708/160 |
| 2004/0049477 A1* | 3/2004 | Powers | G06Q 10/10 |
| 2004/0078493 A1 | 4/2004 | Blumrich et al. | |
| 2004/0103218 A1 | 5/2004 | Blumrich et al. | |
| 2005/0114440 A1 | 5/2005 | Waxman et al. | |
| 2008/0004037 A1* | 1/2008 | Achlioptas | G01S 5/0236 455/456.1 |
| 2008/0019398 A1 | 1/2008 | Genossar et al. | |
| 2008/0104367 A1 | 5/2008 | Blumrich et al. | |
| 2009/0006808 A1 | 1/2009 | Blumrich et al. | |
| 2010/0122268 A1 | 5/2010 | Jia | |
| 2014/0075452 A1 | 3/2014 | Supalov et al. | |
| 2014/0122960 A1 | 5/2014 | Aliseychik et al. | |
| 2016/0036669 A1* | 2/2016 | Jha | H04L 43/087 709/224 |

OTHER PUBLICATIONS

Ferreira et al., "Characterizing Application Sensitivity to OS Interference Using Kernel-Level Noise Injection", International Conference for High Performance Computing, Networking, Storage and Analysis, doi: 10.1109/SC.2008.5219920, Nov. 2008, Austin, Texas, USA 978-1-4244-2835-9/08, pp. 1-12.

Hoefler et al., "The Impact of Network Noise at Large-Scale Communication Performance", IEEE International Symposium on Parallel & Distributed Processing, doi: 10.1109/IPDPS.2009.5161095, May 23-29, 2009, pp. 1-8.

Jones et al., "Impacts of Operating Systems on the Scalability of Parallel Applications", Mar. 5, 2003, UCRL-MI-202629, Lawrence Livermore National Laboratory, pp. 1-11.

Petrini et al., "The Case of the Missing Supercomputer Performance: Achieving Optimal Performance on the 8,192 Processors of ASCI Q", Proceedings of the ACM/IEEE SC2003 Conference (SC'03) Nov. 15-21, 2003, Phoenix, Arizona, USA, 1-58113-695-1/03, © 2003 ACM, pp. 1-17.

Sottile et al., "Performance analysis of parallel programs via message-passing graph traversal", 20th International Parallel and Distributed Processing Symposium, 2006, doi: 10.1109/IPDPS.2006.1639321, 10 pages.

Taboada et al., "Design of efficient Java message-passing collectives on multi-core clusters", J Supercomput, DOI 10.1007/s11227-010-0464-5, © Springer Science+Business Media, LLC 2010, Published online: Aug. 21, 2010, 29 pages.

Appendix P—List of IBM Patents or Patent Applications Treated as Related, 2 pages.

Kurt B. Ferreira, The impact of system design parameters on application noise sensitivity, Cluster Computing (CLUSTER), 2010 IEEE International Conference on Sep. 20-24, 2010, 146-155, 978-0-7695-4220-1, Heraklion, Crete.

Mamadou, H. N., A robust dynamic optimization for MPI Alltoall operation, Parallel & Distributed Processing, 2009. IPDPS 2009. IEEE International Symposium on May 23-29, 2009, 1-15, 1530-2075, Rome.

* cited by examiner

SELECTION OF MESSAGE PASSING COLLECTIVES IN PRESENCE OF SYSTEM NOISE

BACKGROUND OF THE INVENTION

The present invention relates generally to the field of message passing collectives, and more particularly to handling message passing collectives in the presence of system noise.

The impact of operating system jitter on the performance of a large scale parallel application has been shown to be significant. "Operating system (OS) jitter" refers to performance impact caused due to OS daemons, processes, or interrupts which share computing resources with a target application. These could be essential OS services required for the target application itself to run, but they still do degrade the performance of the target application, and, hence, the impact of these is collectively termed as "OS jitter." Similar to an operating system's jitter, "network jitter" may also significantly degrade the performance of communication intensive applications at scale. Sources of network jitter may include cluster/network management software subsystems and/or other applications executing simultaneously on the cluster and flooding the shared communication/IO network. Herein, operating system jitter and network jitter collectively as "system jitter."

Message Passing Interface (MPI) is a standardized and portable message-passing system: (i) designed by a group of researchers from academia and industry; and (ii) which functions on a wide variety of parallel computers. The standard defines the syntax and semantics of a core of library routines useful to a wide range of users writing portable message-passing programs in various programming languages. MPI helped facilitate the development of the "parallel software industry." MPI has also facilitated development of portable and scalable large-scale parallel applications.

"Collectives" are a set of functions offered by the MPI (message passing interface) standard which provide optimized algorithms for communication heavy operations between large numbers of tasks. A few examples of collectives are: broadcast, scatter-gather, reductions, alltoall, allgather, etc. These are widely used in all parallel applications and often the overall performance of a parallel application depends heavily on the performance of these collectives. Hence, current MPI libraries offer methods by which collective algorithms can be selected dynamically based on criteria such as scale, message size, topology, and other parameters. This feature is herein referred to as "collective algorithms selection."

SUMMARY

According to an aspect of the present invention, there is a method, computer program product and/or system that performs the following steps (not necessarily in the following order): (i) providing a plurality of message passing collectives algorithms; (ii) evaluating each algorithm of the plurality of message passing collectives algorithms for performance when subject to at least one type(s) of jitter to obtain jitter evaluations; and (iii) ranking the plurality of message passing collectives algorithms relative to each other based upon the jitter evaluations to obtain a first ranking.

According to a further aspect of the present invention, a method, system and/or computer program product performs the following actions (not necessarily in the following order): (i) providing a plurality of message passing collectives algorithms; (ii) evaluating each algorithm of the plurality of message passing collectives algorithms for performance when subject to at least one type(s) of jitter to obtain jitter evaluations; (iii) ranking the plurality of message passing collectives algorithms relative to each other based upon the jitter evaluations to obtain a first ranking; (iv) selecting, at runtime, a first message passing collectives algorithm from the plurality of message passing collectives algorithm, where the selection is based, at least in part, on the first ranking; (v) performing message passing using the first message passing collectives algorithm; and (vi) estimating a level of system jitter that will occur at runtime through performance data collected by benchmarks during offline calibration to obtain an estimated system jitter level. The selection of the first message passing collectives algorithms is further based, at least in part, upon a first non-jitter factor which is not related to any type of jitter. The at least one type(s) of jitter includes both of the following types of jitter: operating system jitter and/or network jitter.

DETAILED DESCRIPTION

Some embodiments of the present invention select a "message passing collectives algorithm" used in a message passing interface based, in part, on consideration of jitter (for example, "system jitter" (that is, OS jitter and/or network jitter)). In some embodiments, multiple rankings are performed for different levels of system jitter. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
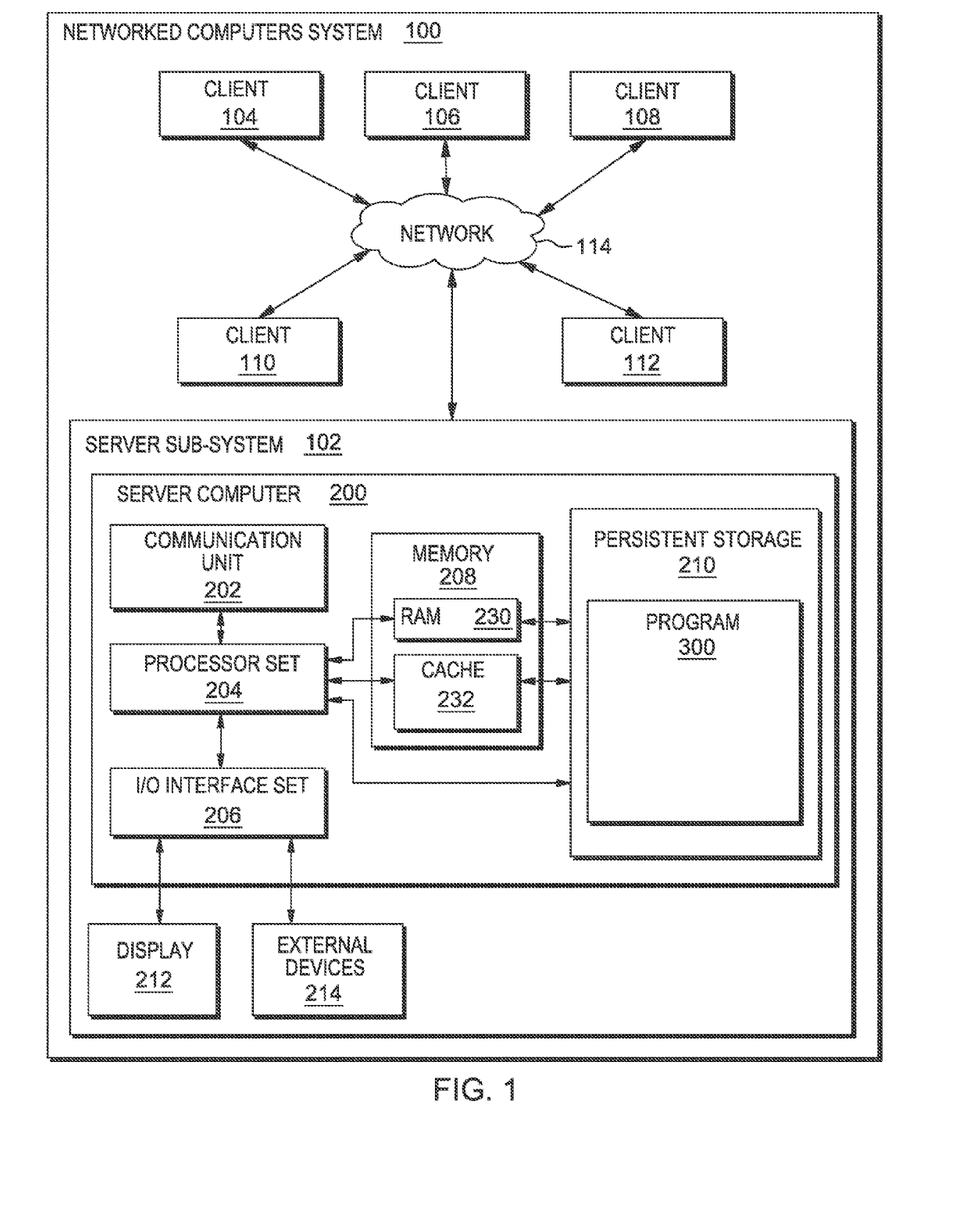
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
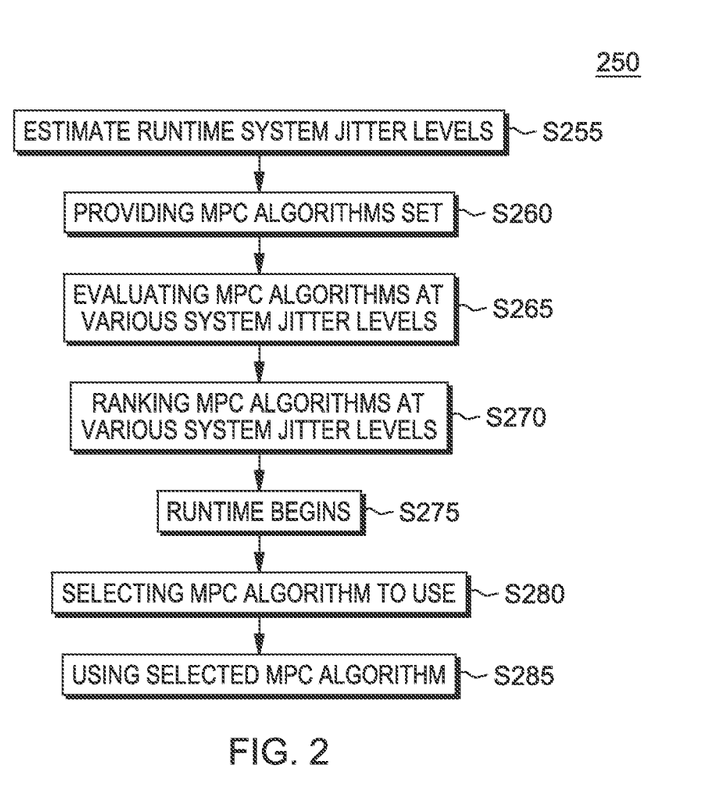
FIG. 2 is a flowchart showing a first embodiment method performed, at least in part, by the first embodiment system.
Figure 3:
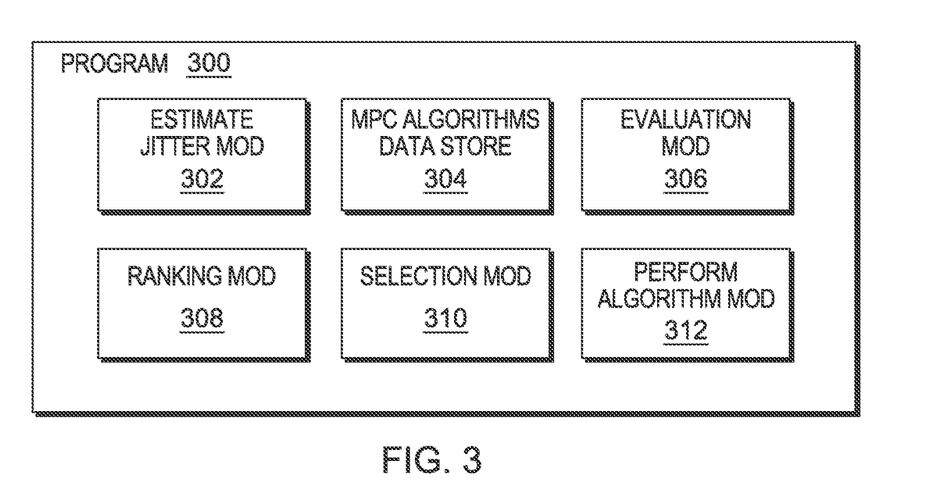
FIG. 3 is a block diagram view of a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where estimate jitter module ("mod") 302 estimates a system jitter level that will occur at runtime. In this embodiment, this estimation is accomplished through performance data collected by benchmarks during runtime calibration.

Processing proceeds to step S260, where MPC (message passing collectives) algorithms data store 304 is stocked with a set of message passing collectives algorithms. In this embodiment, all of the MPC algorithms are currently conventional algorithms and have not been designed with the present invention in mind. However, some MPC algorithms perform better than others at a given level of system jitter. In some embodiments of the present invention, the jitter-related performance, as evaluated by the techniques of the present invention, may be used to help design new MPC algorithms that do not yet exist.

Processing proceeds to step S265, where evaluation mod 306 evaluates the performance of the MPC algorithms of data store 304 at various assumed levels of system jitter. Techniques for making this evaluation will be discussed in more detail, below, in the Further Comments And/Or Embodiment(s) sub-section of this Detailed Description section. The results of this evaluation will herein be referred to as jitter evaluations. Alternatively, the jitter evaluations may be made at only a single assumed level of jitter (for example, the estimated level of jitter determined at step S255). In this embodiment, the jitter evaluations take into account only system jitter (that is, OS jitter and network jitter). Alternatively, the jitter evaluations may take into account other types of jitter.

Processing proceeds to step S270 where ranking mod 308 ranks the MPC algorithms of data store 304 for various assumed levels of system jitter. Alternatively, the MPC algorithms may be ranked for only a single assumed level of jitter (for example, the estimated level of jitter determined at step S255). Techniques for making these rankings will be discussed in more detail, below, in the Further Comments And/Or Embodiment(s) sub-section of this Detailed Description section.

Processing proceeds to step S275 where runtime of the message passing system begins.

Processing proceeds to step S280 where selection mod 310 selects the MPC algorithm to use in runtime operations of the message passing system. In this embodiment, this selection is based: (i) in part upon the jitter rankings made by ranking mod 308; and (ii) based on other non-jitter factors. The other non-jitter factors will not be discussed in detail here because, at least in this embodiment, they are conventional factors used in conventional selection of an MPC algorithm from among the many known MPC algorithms. The consideration of these non-jitter factors mean that the top ranked MPC algorithm will not always be the selected algorithm at step S280. Nevertheless, the ranking(s) of step S270 will be considered, and this consideration of jitter will likely have some marginal (and favorable) affect upon which MPC algorithm is selected at step S280.

Processing proceeds to step S285, where perform algorithm mod 312 uses the selected MPC algorithm, selected at step S280, in the runtime operations of the message passing system.

III. Further Comments and/or Embodiments

Some embodiments of the present invention recognize the following facts, potential problems and/or potential areas for improvement with respect to the current state of the art: (i) because message passing collectives are network intensive operations, their performance is susceptible to network jitter and operating system jitter; (ii) research by the named inventors of this document has found substantial degradations in performance of message passing collectives in presence of system jitter (that is, OS jitter and network jitter considered collectively); (iii) performance of message passing collectives depends on many factors such as system architecture, message size, and algorithm being used; (iv) many advanced message passing library implementations use dynamic collectives selection strategies based on pre-computed heuristics to choose the most efficient algorithm based on scale, architecture, and message size; (v) in a typical execution flow of a parallel program, runtime collectives selection logic takes over immediately when a collectives function call is made; (vi) selection logic selects the most optimal collectives algorithm for the given selection criteria such as scale, network topology, and message size; (vii) for efficient implementation of runtime collectives selection it is usually preferable for selection overheads to have minimal impact on application performance; (viii) for the foregoing reasons, most implementations of message passing collectives include an offline calibration step on the target system which analyzes and pre-computes selection tables based on different combinations of message size, scale, and topology; (ix) at runtime the selection logic does multidimensional table-lookup (and if needed interpolation and/or extrapolation) to select an appropriate algorithm for given situation; and/or (x) jitter can cause significant performance degradation in collectives algorithms.

Some embodiments of the present invention may include one, or more, of the following features, characteristics and/or advantages: (i) provide a solution that considers jitter as a criteria in collectives selection strategies and/or in a collective selection algorithm; (ii) revises the process of collectives algorithms selection by incorporating the impact of system jitter; and/or (iii) not restricted for use with MPI alone and can as seamlessly be applied to other parallel programming languages and/or paradigms such as UPC (Unified Parallel C), CAF (Coarray Fortran), and X10; (iv) builds on the currently conventional methodology set forth in the previous paragraph of this document; (v) includes performance impacts due to system jitter as a selection criterion; (vi) allows for better selection of a collective algorithm at a given level of system jitter for improved performance; (vii) improves performance of an application, especially when application-related messaging is performed at a large scale; (viii) improves algorithm selection from a message passing library; (ix) improves message passing interface; (x) a framework for systematic study of the effects of system jitter on collectives algorithms performance; (xi) framework of the previous item can facilitate potential improvements in the design and performance of message passing algorithms; (xii) the estimation of noise levels can result in data correlating system jitter with application performance; and/or (xiii) estimation of noise levels can help workload managers (job schedulers) improve system resource allocation strategies (such as, task mapping and job allocation).

Figure 4:
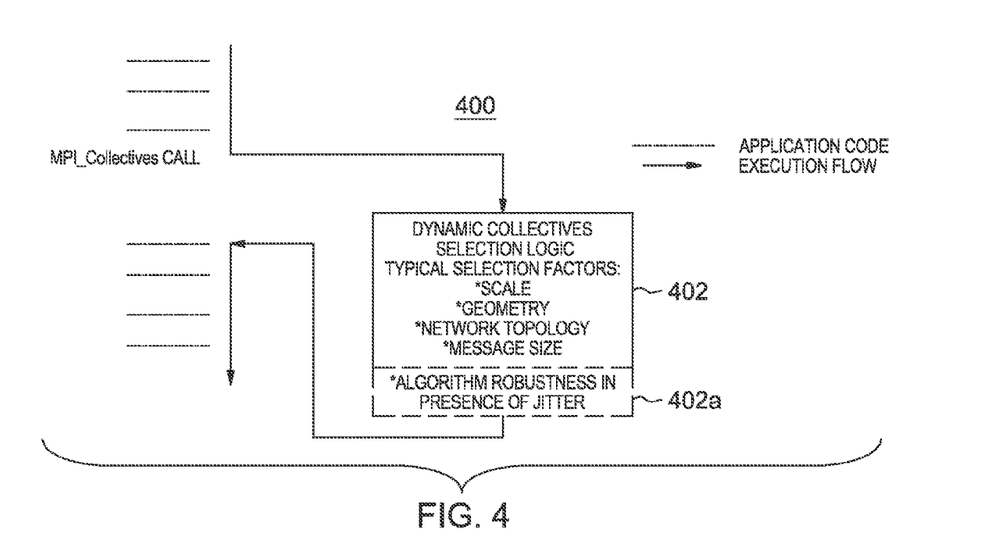
FIG. 4 is a diagram illustrating operation of an embodiment of the present invention.

As shown in FIG. 4, diagram 400 schematically depicts a runtime selection process according to an embodiment of the present invention. As shown in block 402 of diagram 400, this selection process uses scale, geometry (tasks per node), topology and message size as the selection criteria. As shown in portion 402a of block 400, this embodiment further includes, as a factor in selecting a collectives algorithm to be used from among multiple predetermined collectives algorithms, the performance of the algorithm in the presence of jitter. In this embodiment, any and all types of "jitter" are considered as a factor in selecting the algorithm. In other embodiments, only "system jitter" is considered, to the exclusion of other types of jitter. In other embodiments, only "OS jitter" is considered, to the exclusion of other types of jitter. In other embodiments, only "network jitter" is considered, to the exclusion of other types of jitter.

Some embodiments of the present invention may include one, or more, of the following features, characteristics and/or advantages: (i) selects most optimally performing collective algorithm at a given level of system jitter; (ii) adds a significant improvement to the performance of the application, especially at large scale; (iii) improves on currently conventional message passing libraries collectives algorithm selection capabilities to provide a competitive edge in message passing interface performance; (iv) provides a framework for systematic study of the effects of system jitter on collectives algorithms performance, leading to potential improvements in the design and performance of these algorithms; and/or (v) the estimation of noise levels according to some embodiments of the present invention can result in data correlating system jitter with application performance, which can help workload managers (job schedulers) improve system resource allocation strategies (such as task mapping and job allocation). As described above, some embodiments of the present invention enhance the existing collectives algorithms selection process by adding the novel dimension of performance characterization of collectives in the presence of jitter. In order to incorporate this process improvement, the currently conventional collectives algorithm selection methodology is modified as will now be discussed.

Figure 5:
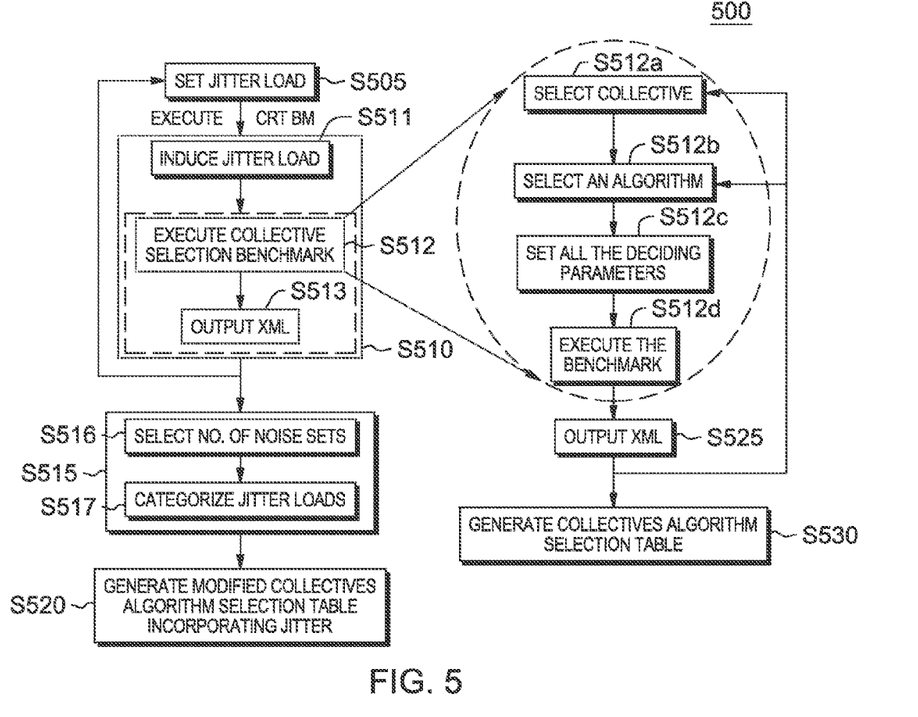
FIG. 5 is a flowchart showing a second embodiment method according to the present invention.

The embodiment of FIGS. 4 to 9 includes two main stages: (i) offline calibration (described in connection with FIGS. 5, 6 and 7); and (ii) runtime selection (described in connection with FIGS. 4, 8 and 9). As shown in FIG. 5, flow chart 500 shows offline calibration stage according to an embodiment of the present invention. The left side of the flow chart 500 shows a portion of the method directed to optimal collective selection, which encompasses the currently conventional procedure detailed on the right side of flow chart 500. Flow chart 500 includes the following steps and sub-steps (with process flow between and among the steps and sub-steps as shown in FIG. 5): S505; S510 (including sub-steps S511, S512 (including sub-sub-steps S512a, S512b, S512c), S513); S515 (including sub-steps S516 and S517); S520; S525; and S530.

The offline calibration stage involves performance data collection of all collectives algorithms at differing scales, topologies, and message sizes in the presence of induced, but calibrated, network jitter exhibiting various jitter communication patterns. This embodiment of the present invention uses a benchmark that allows users to iterate over combinations of collectives algorithms, number of nodes, geometry of tasks per node, network topology, and message sizes in the presence of induced jitter. The amplitude of jitter and its patterns are controllable by command-line parameters. The benchmark outputs performance tables with minimum, maximum and average performance of collectives over many iterations for each combination of input parameters such as algorithm, number of nodes, tasks per node, topology, message size, and jitter amplitude and pattern. In this embodiment, the benchmark is called CRT (Collectives Robustness Test). The outputs of CRT are processed, and algorithms ranked based on their performance and standard deviation from average performance to rank them in decreasing order of robustness in presence of jitter. Software according to the present invention can reuse and extend existing methods used for ranking algorithms based on performance by adding the jitter dimension to the existing frameworks. The result is a set of collectives selection tables which can be navigated based on scale, geometry, message size, and jitter level to choose an optimal algorithm.

For effective collectives selection, CRT benchmark should be run on the production system to mimic typical runtime conditions as closely as possible. CRT focuses primarily on tuning network jitter. It should be noted that when the CRT benchmark is run on a production system for a long enough duration, effects of the operating systems jitter are captured in the min-max spread of the performance results.

Figure 6:
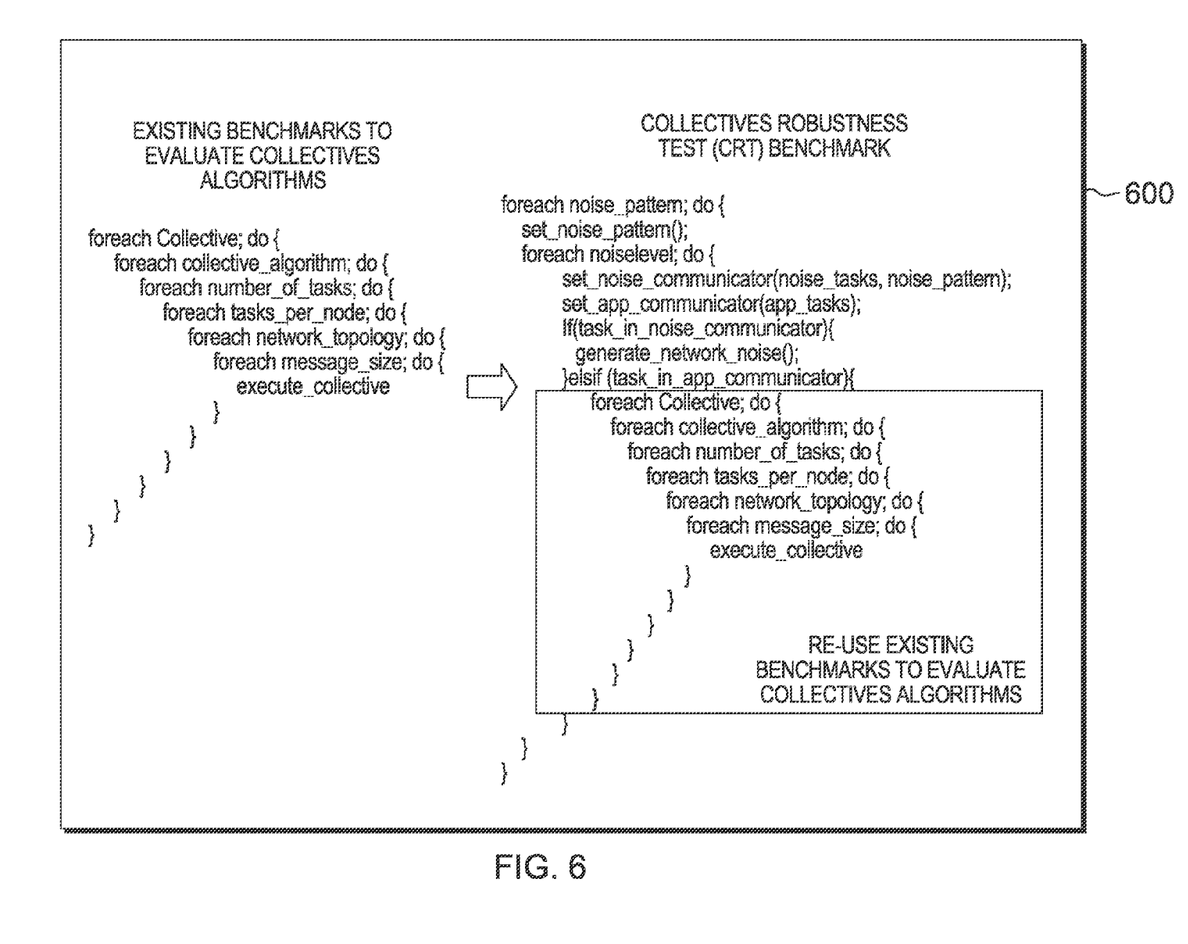
FIG. 6 is a code block used in an embodiment of the present invention.

As shown in FIG. 6, code block 600 shows how CRT functionally extends existing benchmarks to evaluate performance of collectives algorithms. More specifically, code block 600 is a functional illustration of how CRT extends existing benchmarks to evaluate collectives.

Figure 7:
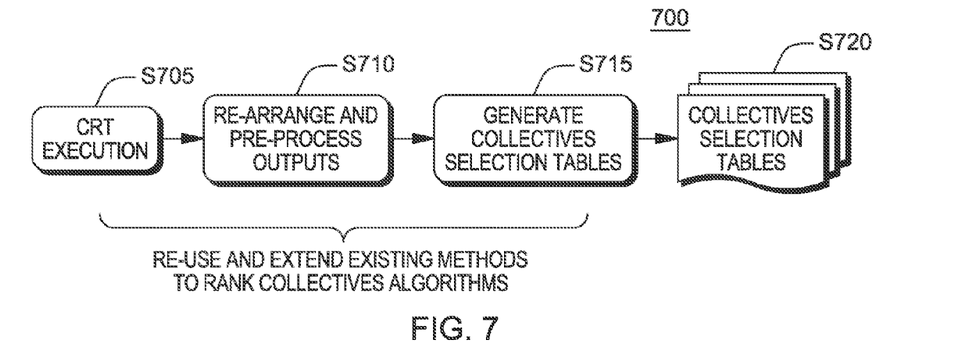
FIG. 7 is a flowchart showing a third embodiment method according to the present invention.

As shown in FIG. 7, flow chart 700 shows steps in the calibration stage. More specifically, the calibration stage steps of the method of flow chart 700 are sequentially performed in the following order: S705; S710; S715; and S720. At step S720, the collectives selection tables are saved and/or communicated as needed for later use in methods according to the present invention.

The runtime selection stage will now be discussed. As illustrated in FIG. 4, runtime collectives selection logic takes over at the instance of a collectives function call in an MPI program. This logic uses input parameters such as message size, scale, geometry, and topology to parse through the pre-computed selection tables from the offline calibration stage. For extension to this logic, a sense of current system jitter levels is provided. For this, this embodiment of the present invention uses a sliding window approach. More specifically, software according to the present invention monitors the completion times of the last n collectives function invocations. Using a weighted average value of these completion times (biased towards neighboring, past samples) the software does a reverse-lookup on the selection tables to get an estimate of current jitter levels in the system. This identifies the noise set/band in which the current levels of jitter fall under. This noise set is used to traverse the first dimension of the forward_lookup process to identify the optimal collectives algorithm. The rest of the parameters (such as, number of nodes, tasks per node, message size, and collective function) are used to traverse through other dimensions of this search space to identify the optimal collectives algorithm. This is illustrated in flowchart 700 of FIG. 7 and diagrams 800 and 900 of FIGS. 8 and 9, respectively. This is also illustrated in equations which will be set forth, below.

Expression (1), as follows, is for reverse lookup to estimate current jitter levels:

NSX=reverse_lookup(tavg, num_nodes,tasks_per_node,msg_sz,coll_func),

Expression (2), as follows, is for forward lookup to select optimal collectives algorithm:

CollAlg=forward_lookup(NSX, num_nodes,tasks_per_node,msg_sz,coll_func).

Under various embodiments of the present invention, various techniques (now known or to be developed in the future) may be used to "estimate the current level of system jitter." Another approach that can potentially be applied to estimate the level of system jitter is to use CPU, NIC, and switch level performance counters to analyze the current load on the system. Thus, any technique that can help estimate current levels of jitter can be used along with our methodology for optimal collective selection.

Figure 8:
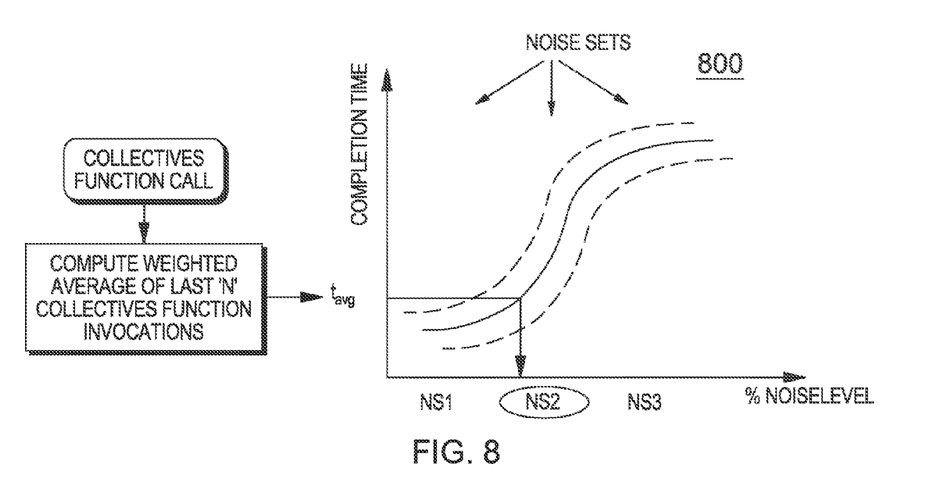
FIG. 8 is a diagram helpful in understanding some embodiments of the present invention.
Figure 9:
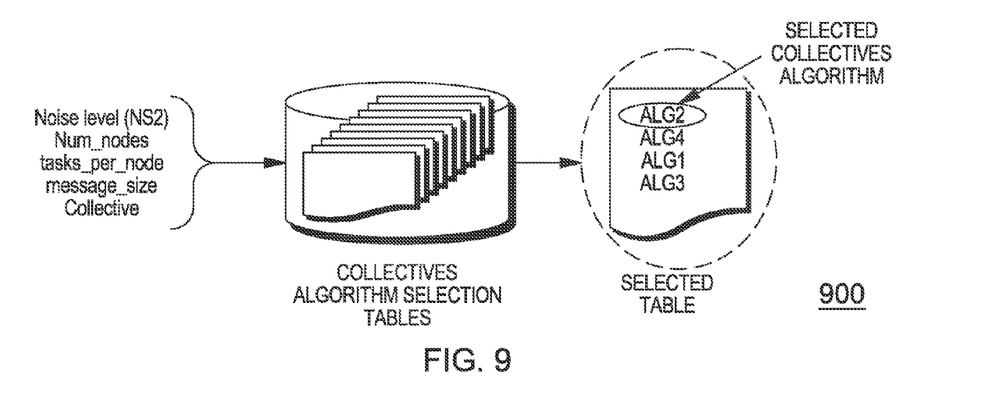
FIG. 9 is a diagram helpful in understanding some embodiments of the present invention.

As shown in FIGS. 8 and 9, diagrams 800 and 900 provide another illustration of various steps in the calibration stage. More specifically: (i) diagram 800 of FIG. 8 shows the reverse lookup process for identifying the current noise level; and (ii) diagram 900 of FIG. 9 shows the forward lookup process to select the optimal collective algorithm.

Some embodiments of the present invention may include one, or more, of the following features, characteristics and/or advantages: (i) methodology for evaluating and ranking different collectives algorithms based on their robustness in the presence of system jitter levels and using this information in selecting optimal collectives algorithms at runtime; (ii) methodology to augment existing collectives selection frameworks to add jitter dimension to collectives selection logic; (iii) methodology to estimate system jitter at run time through the performance data collected by benchmarks during offline calibration; and/or (iv) methodology to select collectives algorithms for various system jitter levels.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A computer-implemented method comprising:
    providing a plurality of message passing collectives algorithms;
    evaluating each algorithm of the plurality of message passing collectives algorithms for performance when subject to at least one type(s) of jitter to obtain jitter evaluations;
    ranking the plurality of message passing collectives algorithms relative to each other based upon the jitter evaluations to obtain a first ranking;
    selecting, at runtime, a first message passing collectives algorithm from the plurality of message passing collectives algorithm, where the selection is based, at least in part, on the first ranking;
    performing message passing using the first message passing collectives algorithm; and
    estimating a level of system jitter that will occur at runtime through performance data collected by benchmarks during offline calibration to obtain an estimated system jitter level;
    wherein:
    the selection of the first message passing collectives algorithms is further based, at least in part, upon a first non-jitter factor which is not related to any type of jitter; and
    the at least one type(s) of jitter includes both of the following types of jitter: operating system jitter and/or network jitter.

* * * * *